(12) United States Patent
Takahashi et al.

(10) Patent No.: US 9,660,508 B2
(45) Date of Patent: May 23, 2017

(54) ROTARY ELECTRIC MACHINE FOR VEHICLE

(71) Applicant: Mitsubishi Electric Corporation, Chiyoda-ku, Tokyo (JP)

(72) Inventors: Tomoki Takahashi, Chiyoda-ku (JP); Hideyuki Hayashi, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 361 days.

(21) Appl. No.: 14/259,434

(22) Filed: Apr. 23, 2014

(65) Prior Publication Data

US 2015/0180315 A1  Jun. 25, 2015

(30) Foreign Application Priority Data

Dec. 25, 2013  (JP) ................................ 2013-266514

(51) Int. Cl.
  *H02K 11/00*  (2016.01)
  *H02K 19/36*  (2006.01)

(52) U.S. Cl.
  CPC ................. *H02K 19/365* (2013.01)

(58) Field of Classification Search
  CPC ............................ H02K 11/00; H02K 19/365
  USPC ............................................. 310/63, 71, 68 D
  See application file for complete search history.

(56) References Cited

U.S. PATENT DOCUMENTS

| | | | |
|---|---|---|---|
| 2004/0155540 A1* | 8/2004 | Nakamura | H02K 5/225 310/68 D |
| 2005/0168082 A1* | 8/2005 | Kondo | H02K 19/365 310/68 D |
| 2008/0018186 A1* | 1/2008 | Lybbert | H02K 11/046 310/71 |
| 2008/0238225 A1* | 10/2008 | Oohashi | H01R 39/36 310/71 |

FOREIGN PATENT DOCUMENTS

| | | |
|---|---|---|
| JP | S56-57682 U | 10/1979 |
| JP | 63-107443 A | 5/1988 |
| JP | 06-178518 A | 6/1994 |
| JP | 7-336974 A | 12/1995 |
| JP | 2002136016 A | 5/2002 |
| JP | 2002359960 A | 12/2002 |
| JP | 201098895 A | 4/2010 |

OTHER PUBLICATIONS

Communication dated Nov. 4, 2014 from the Japanese Patent Office in counterpart Japanese Patent Application No. 2013266514.

* cited by examiner

*Primary Examiner* — Hanh Nguyen
(74) *Attorney, Agent, or Firm* — Sughrue Mion, PLLC; Richard C. Turner

(57) ABSTRACT

An object of the present invention is to provide a rotary electric machine for vehicle which can improve workability and efficiently secure an attachment space at low cost. In a rotary electric machine according to the present invention, a terminal 34 is attached on the outside of a rear bracket 21 so as to be overlapped and fitted to a voltage adjustment device 22 in an axial direction. Fitting portions 22*j* and 22*k* made (Continued)

of conductors are provided on the voltage adjustment device 22. Portions 34*m* and 34*p* to be fitted, which are made of conductors, are provided on the terminal 34. The voltage adjustment device 22 and the terminal 34 are integrally fixed to the rear bracket 21, with the fitting portions being fitted into the portions to be fitted.

10 Claims, 21 Drawing Sheets

ROTARY ELECTRIC MACHINE FOR VEHICLE

TECHNICAL FIELD

The present invention relates to a rotary electric machine for vehicle such as an AC electric generator for vehicle provided in an automobile, a bus, a truck, or the like.

BACKGROUND ART

In a conventional AC electric generator for vehicle, a control circuit portion such as a voltage adjustment device or a rectification device, and a terminal block are each fixed individually so as to be radially adjacent to each other on the outside of a side surface of a rear bracket. The control circuit portion such as a voltage adjustment device, and the terminal block are electrically connected to each other by a connection terminal (for example, Patent Document 1).

As another conventional example, a terminal block is shown which accommodates a voltage adjustment device and in which the voltage adjustment device, a connection terminal for an external apparatus, and a terminal connecting the voltage adjustment device and an electric generator component are insert-molded (for example, Patent Document 2).

CITATION LIST

Patent Document

Patent Document 1: Japanese Laid-Open Patent Publication No. 63-107443
Patent Document 2: Japanese Laid-Open Patent Publication No. 6-178518

SUMMARY OF THE INVENTION

Problems to be Solved by the Invention

The conventional AC electric generator for vehicle according to Patent Document 1 has the following problems. That is, since the voltage adjustment device and the terminal block are located so as to radially oppose to each other on the outside of the side surface of the rear bracket, the attachment area increases, and also, since each is fixed individually to the rear bracket, workability is poor. In addition, since electric connection between the voltage adjustment device and the terminal block is made via each terminal, the number of components increases and assembly work is troublesome.

The conventional AC electric generator for vehicle according to Patent Document 2 has the following problems. That is, since the voltage adjustment device and the connection terminal for the external apparatus are integrally formed by a resin, when the shape, the attachment direction, or the like of the connection terminal for the external apparatus is to be changed, it is necessary to manufacture again the whole unit including the voltage adjustment device, and also, in the case of exchange due to failure of the voltage adjustment device, components including the connection terminal for the external apparatus are to be exchanged, resulting in cost increase.

The present invention has been made to solve the above problems, and an object of the present invention is to obtain a rotary electric machine for vehicle having excellent workability and high versatility with low cost.

Solution to the Problems

A rotary electric machine for vehicle according to the present invention includes: a rotary shaft; a magnetic pole iron core fixed to the rotary shaft and having a magnetic pole; a field coil attached at an inner circumferential portion of the magnetic pole iron core; a bowl-like front bracket supported via a front bearing on the rotary shaft; a stator iron core provided so as to oppose to the magnetic pole iron core via a minute clearance; a stator coil wound on the stator iron core; a bowl-like rear bracket supported via a rear bearing on the rotary shaft, and fixing the stator iron core, together with the front bracket; a voltage adjustment device attached on the outside of the rear bracket, for controlling applied current in the field coil; and a terminal attached on the outside of the rear bracket so as to be overlapped and fitted to the voltage adjustment device in an axial direction. A fitting portion made of a conductor is provided on a surface of the voltage adjustment device, that opposes to the terminal. A portion to be fitted, which is made of a conductor, is provided on a surface of the terminal, that opposes to the voltage adjustment device. The voltage adjustment device and the terminal are integrally fixed on the outside of the rear bracket, with the fitting portion being fitted into the portion to be fitted.

Effect of the Invention

According to the present invention, since the voltage adjustment device and the terminal can be attached to the rear bracket so as to be overlapped and fitted in the axial direction, the attachment area for these in the radial direction can be decreased, and therefore the attachment area for other components such as the rectification device can be increased.

In addition, since each of the voltage adjustment device and the terminal can be independently detached from the rear bracket, each of the voltage adjustment device and the terminal can be exchanged as a single component, and therefore the cost decreases.

Further, since the shape and the attachment direction of the connection terminal of the terminal or the like can be adjusted in accordance with the specifications relevant to the vehicle, the versatility increases and this contributes to further decrease in the cost.

Still further, since the fitting portion made of a conductor, of the voltage adjustment device is fitted into the portion to be fitted of the terminal, which is made of a conductor, so that the voltage adjustment device and the terminal can be integrally attached, positioning for both components is facilitated and assembly work is improved.

In addition, since the voltage adjustment device and the terminal are attached on the outside of the rear bracket so as to be overlapped and fitted in the axial direction, it becomes possible to integrally fix them to the rear bracket from the axial direction by the same fastening screw, and therefore assembly work is not troublesome at all.

DESCRIPTION OF EMBODIMENTS

Embodiment 1

Figure 1:
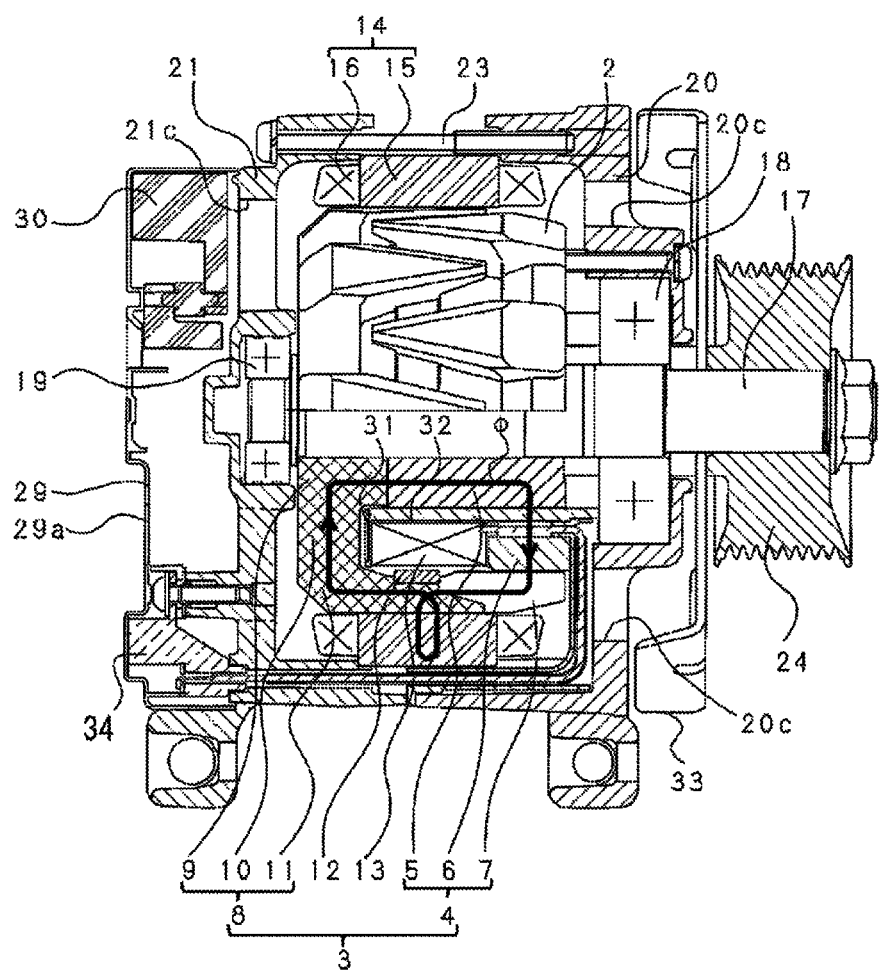
FIG. 1 is a vertical sectional view showing a brushless AC electric generator for vehicle according to embodiment 1 of the present invention.
Figure 2:
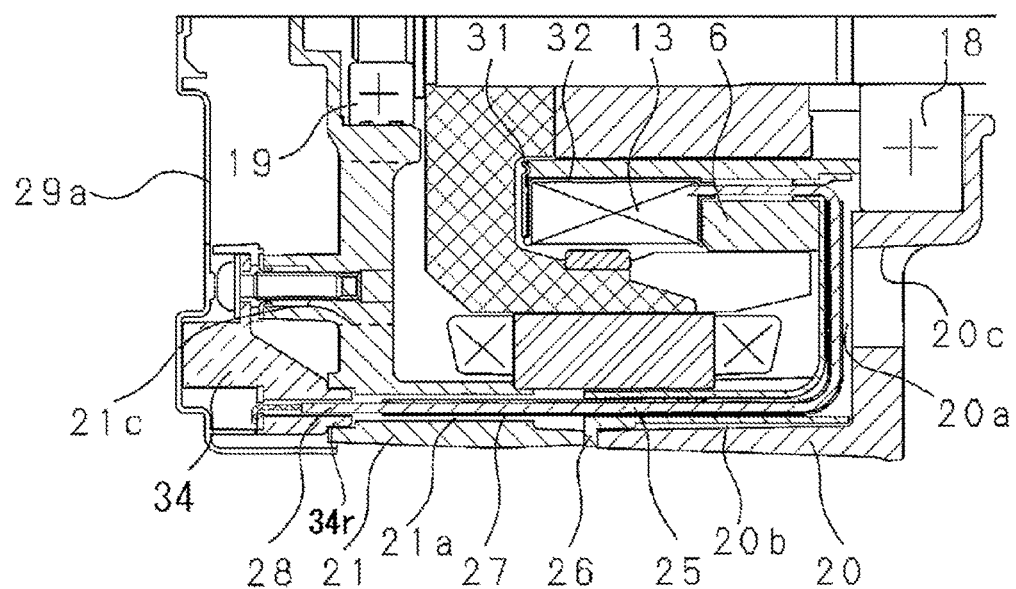
FIG. 2 is an enlarged sectional view showing a major part in FIG. 1.
Figure 3:
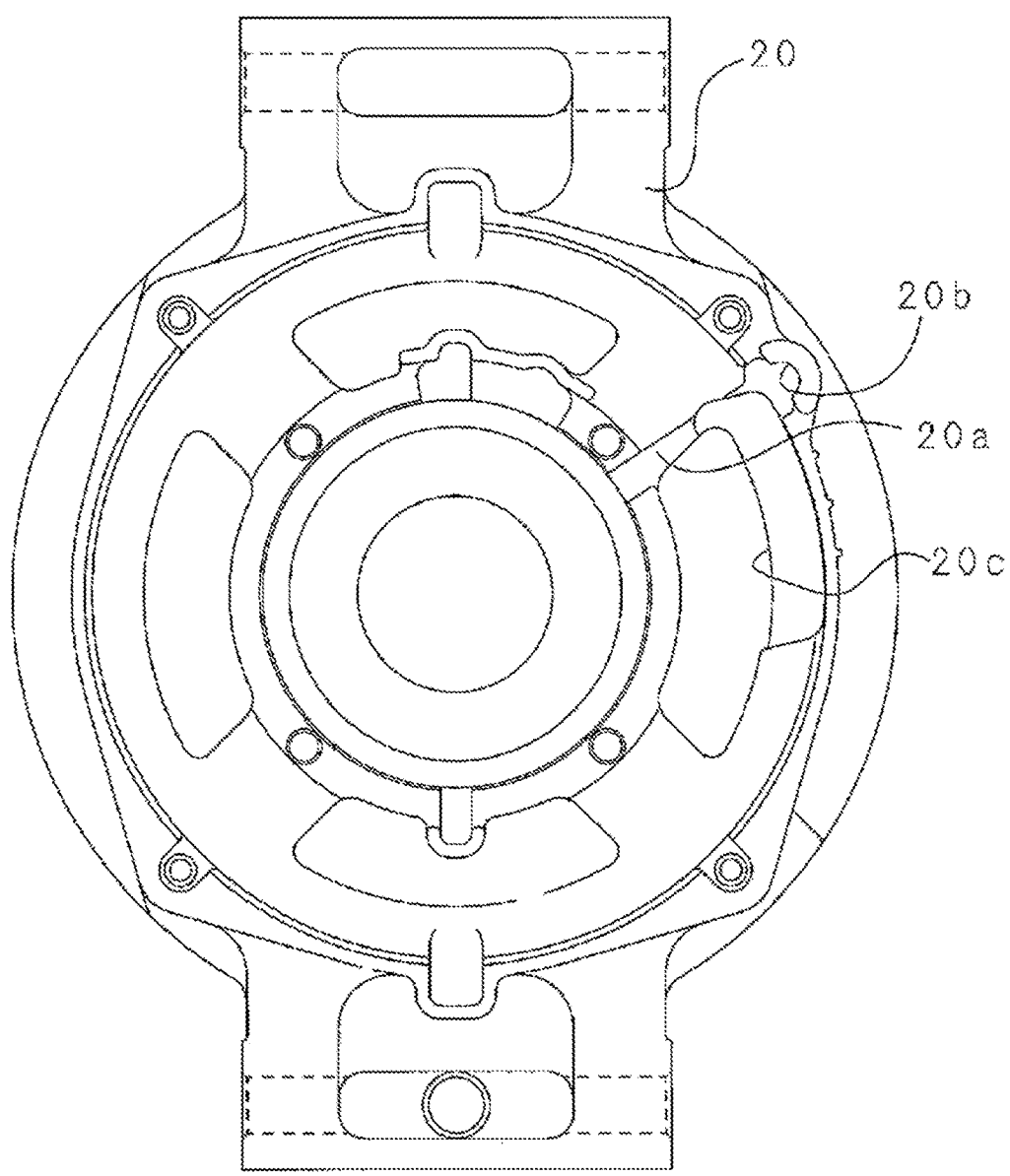
FIG. 3 is a front view of a front bracket of the brushless AC electric generator for vehicle shown in FIG. 1 as seen from inside.
Figure 4:
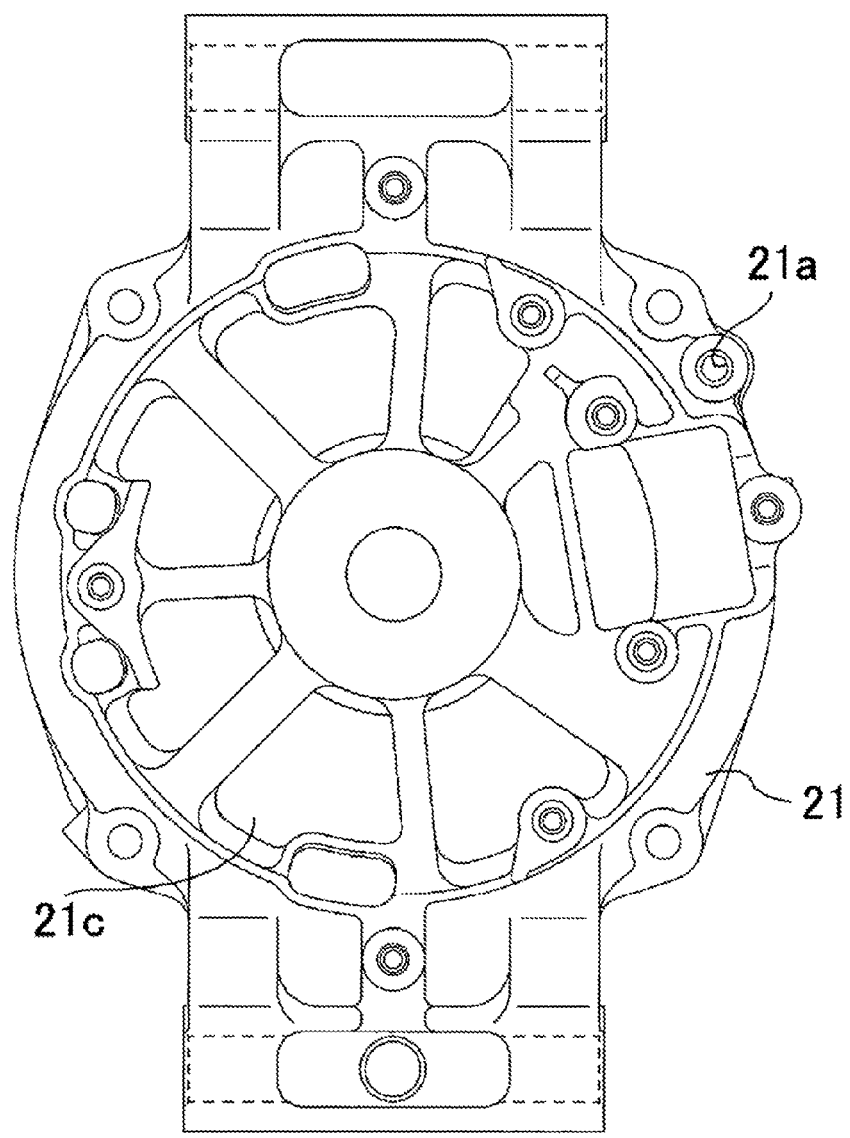
FIG. 4 is a front view of a rear bracket of the brushless AC electric generator for vehicle shown in FIG. 1 as seen from outside.
Figure 5:
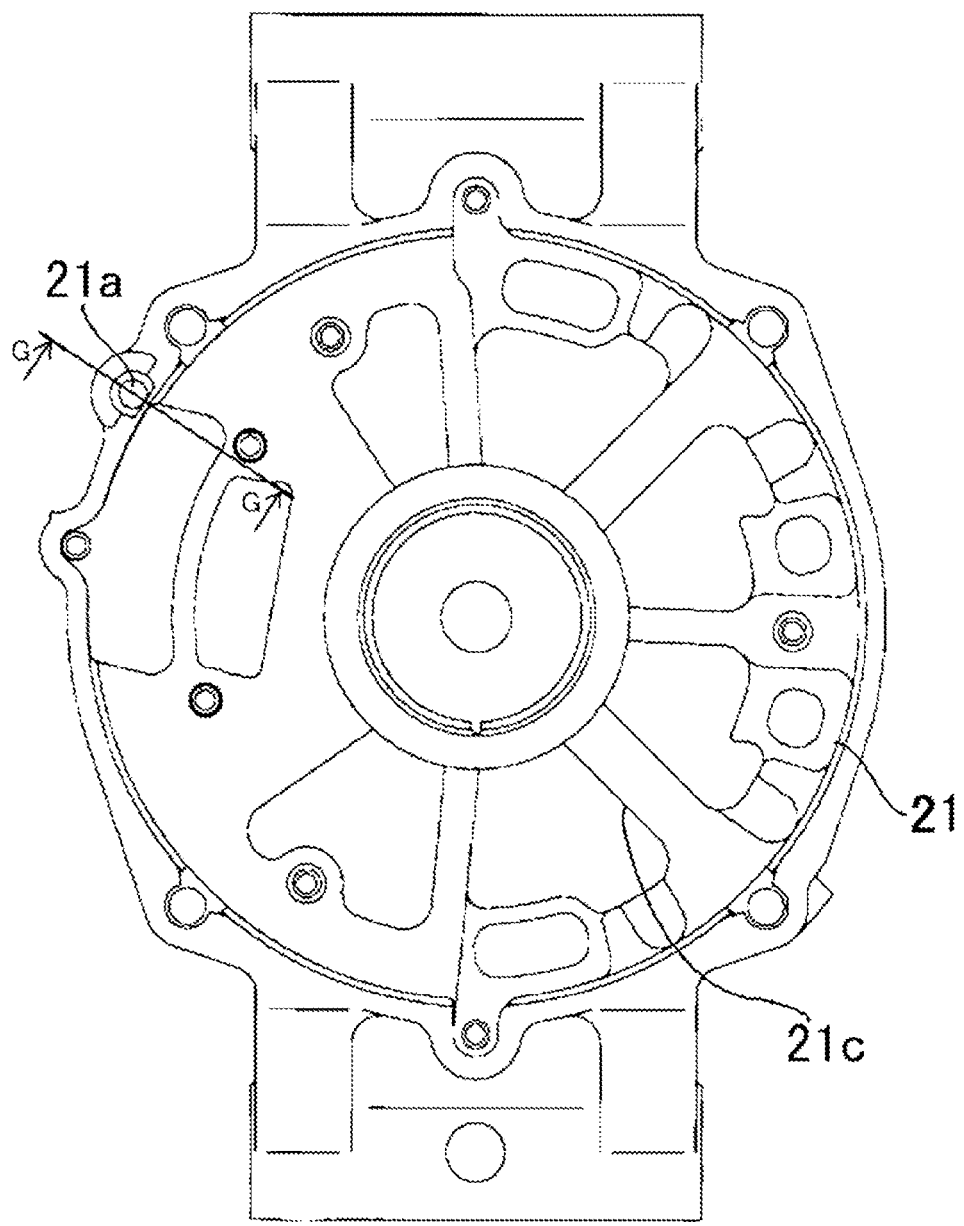
FIG. 5 is a front view of the rear bracket of the brushless AC electric generator for vehicle shown in FIG. 1 as seen from inside.
Figure 6:
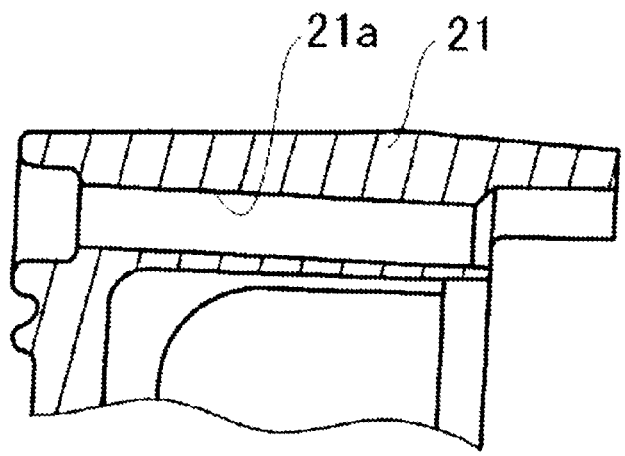
FIG. 6 is a sectional view along G-G line in FIG. 5.
Figure 7:
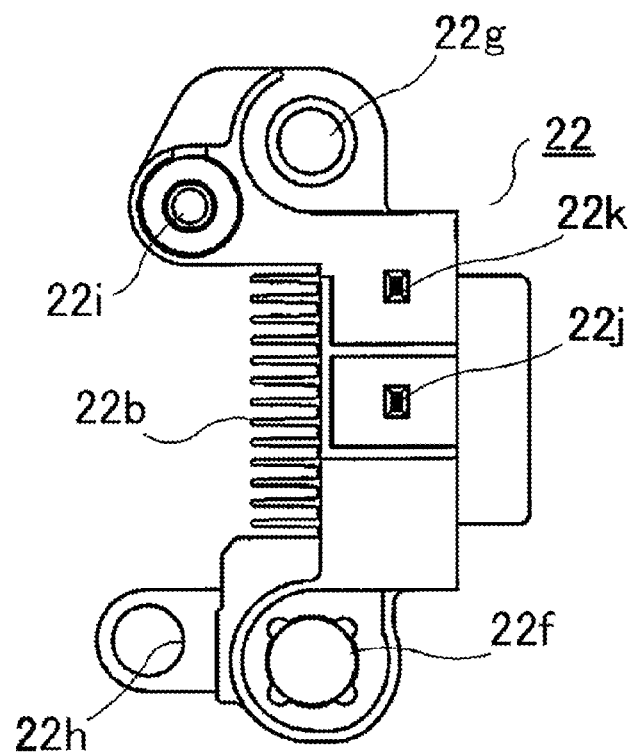
FIG. 7 is a front view showing a voltage adjustment device of the brushless AC electric generator for vehicle shown in FIG. 1.
Figure 8:
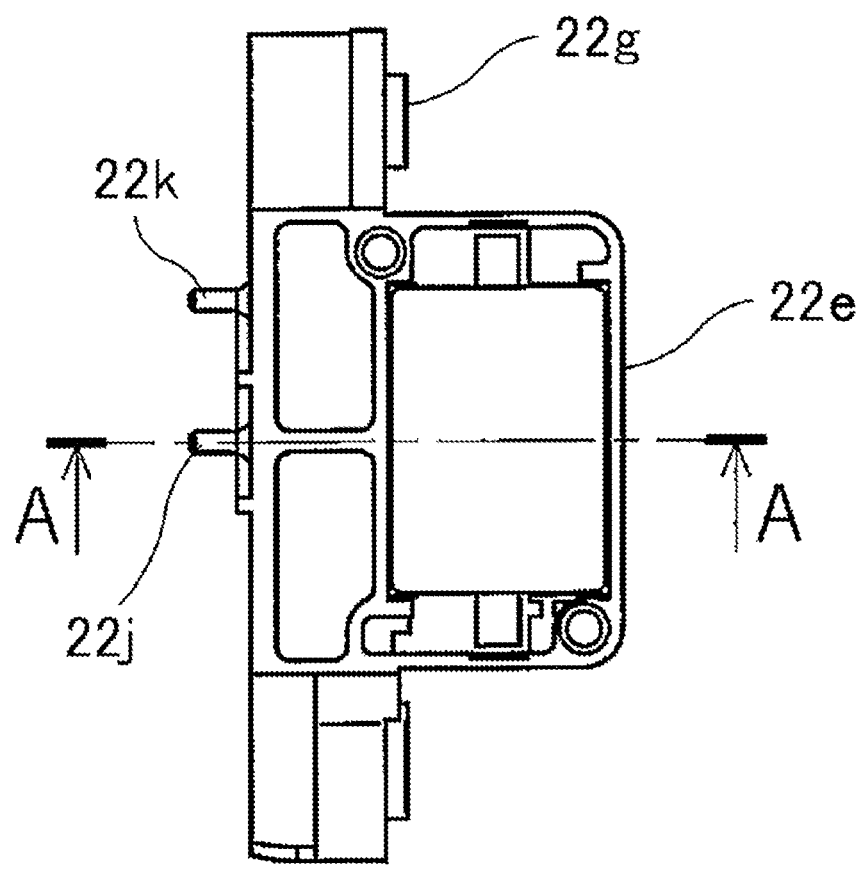
FIG. 8 is a right side view of the voltage adjustment device shown in FIG. 7.
Figure 9:
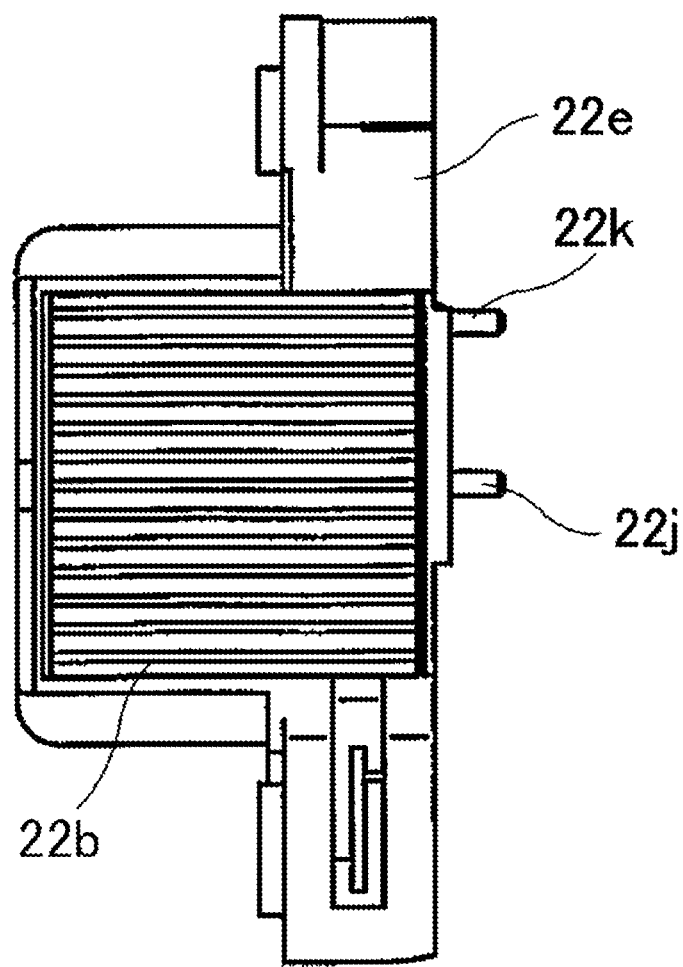
FIG. 9 is a left side view of the voltage adjustment device shown in FIG. 7.
Figure 10:
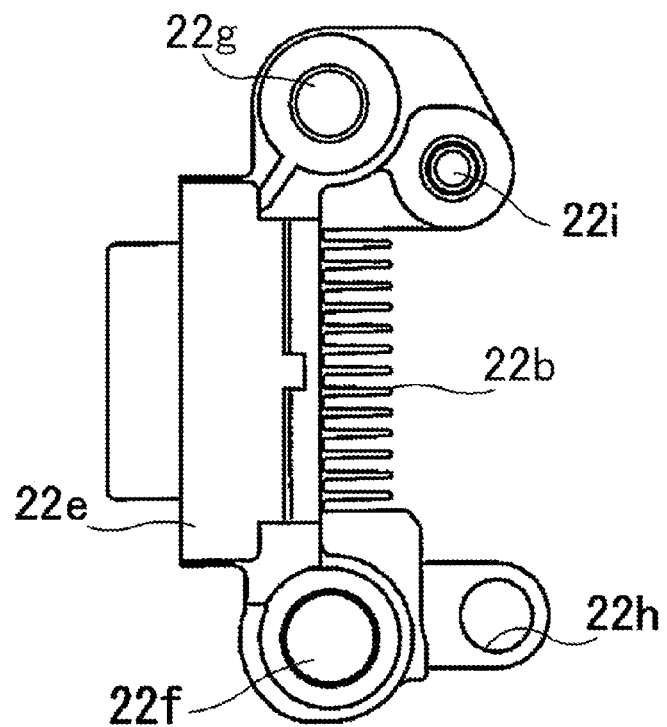
FIG. 10 is a back view of the voltage adjustment device shown in FIG. 7.
Figure 11:
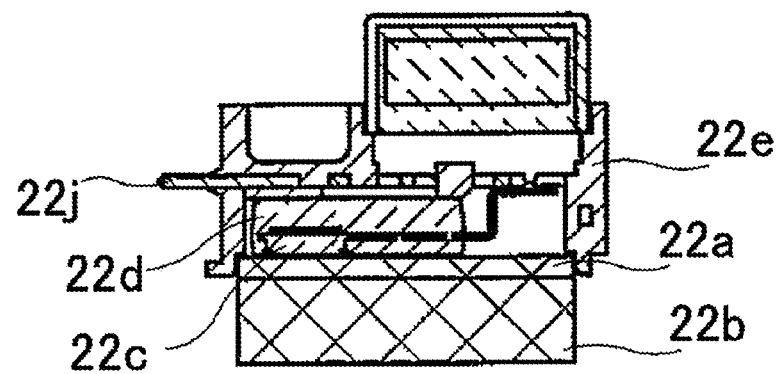
FIG. 11 is a sectional view along A-A line in FIG. 8.
Figure 12:
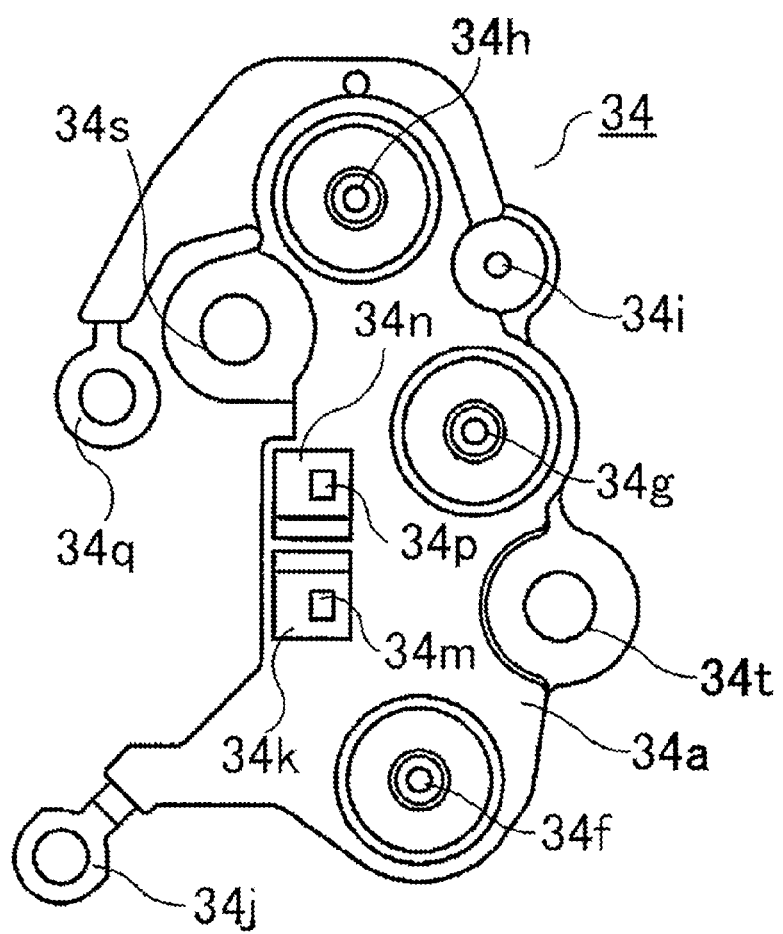
FIG. 12 is a front view showing a terminal of the brushless AC electric generator for vehicle shown in FIG. 1.
Figure 13:
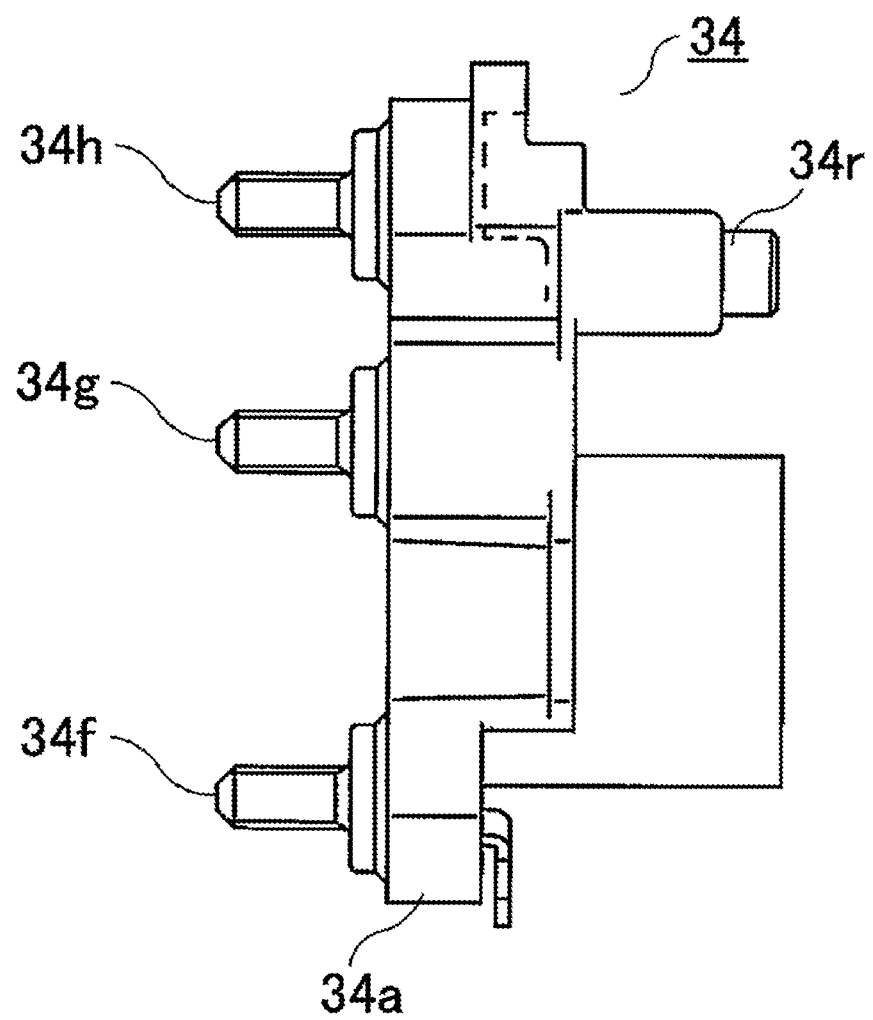
FIG. 13 is a right side view of the terminal shown in FIG. 12.
Figure 14:
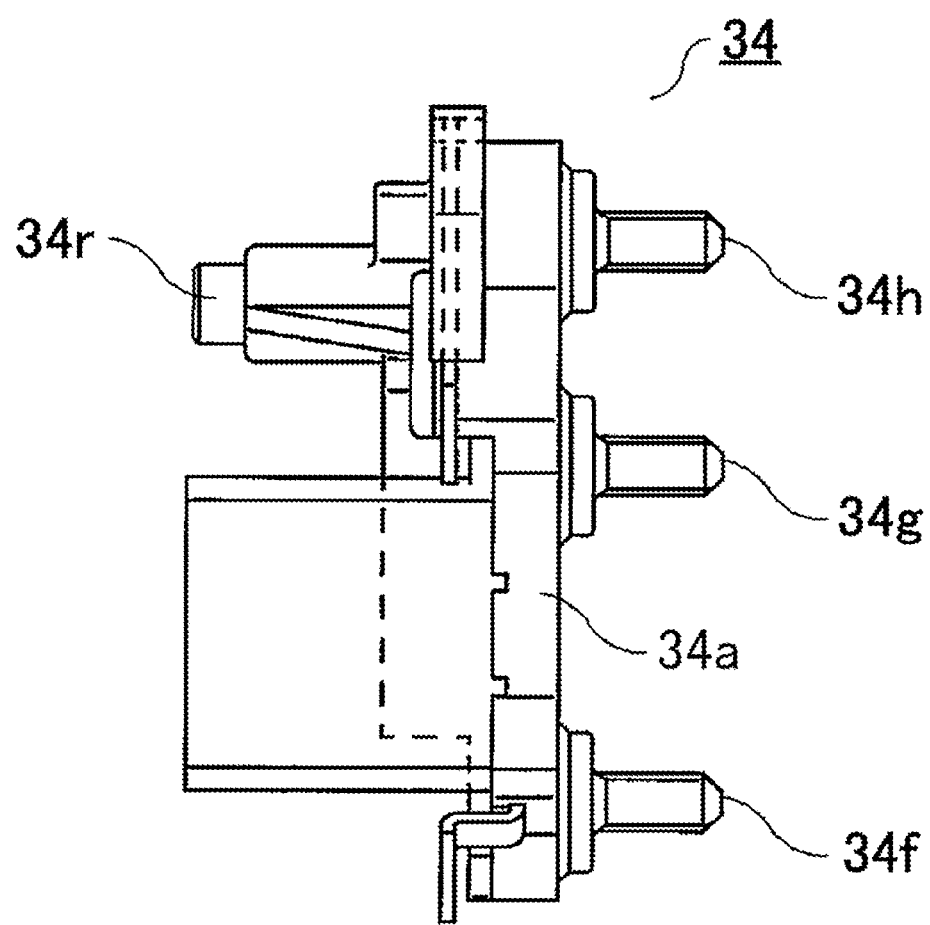
FIG. 14 is a left side view of the terminal shown in FIG. 12.
Figure 15:
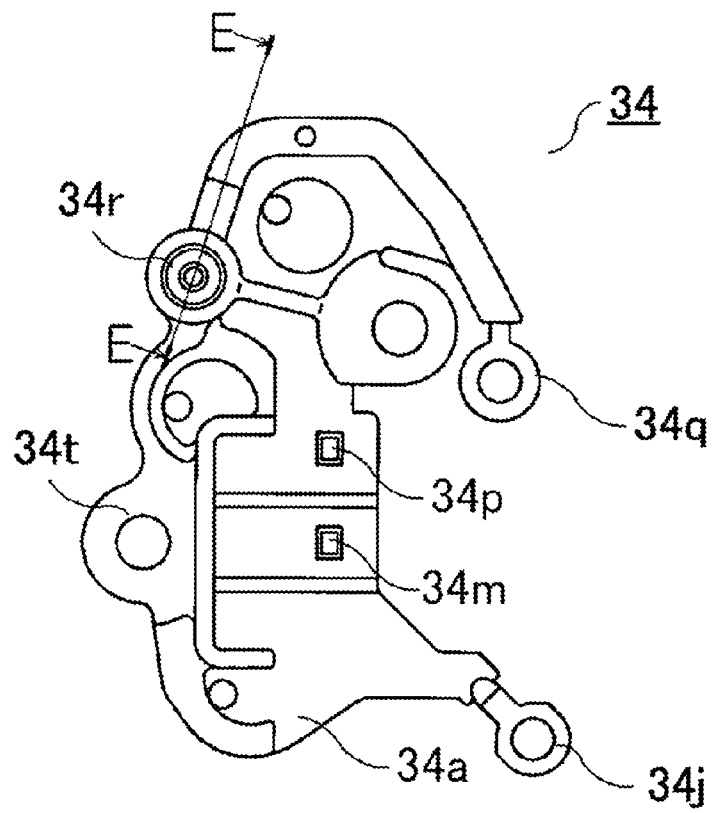
FIG. 15 is a back view of the terminal shown in FIG. 12.
Figure 16:
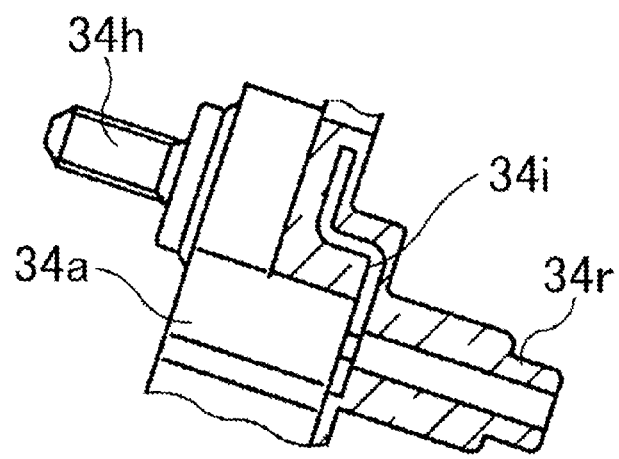
FIG. 16 is a sectional view along E-E line in FIG. 15.
Figure 17:
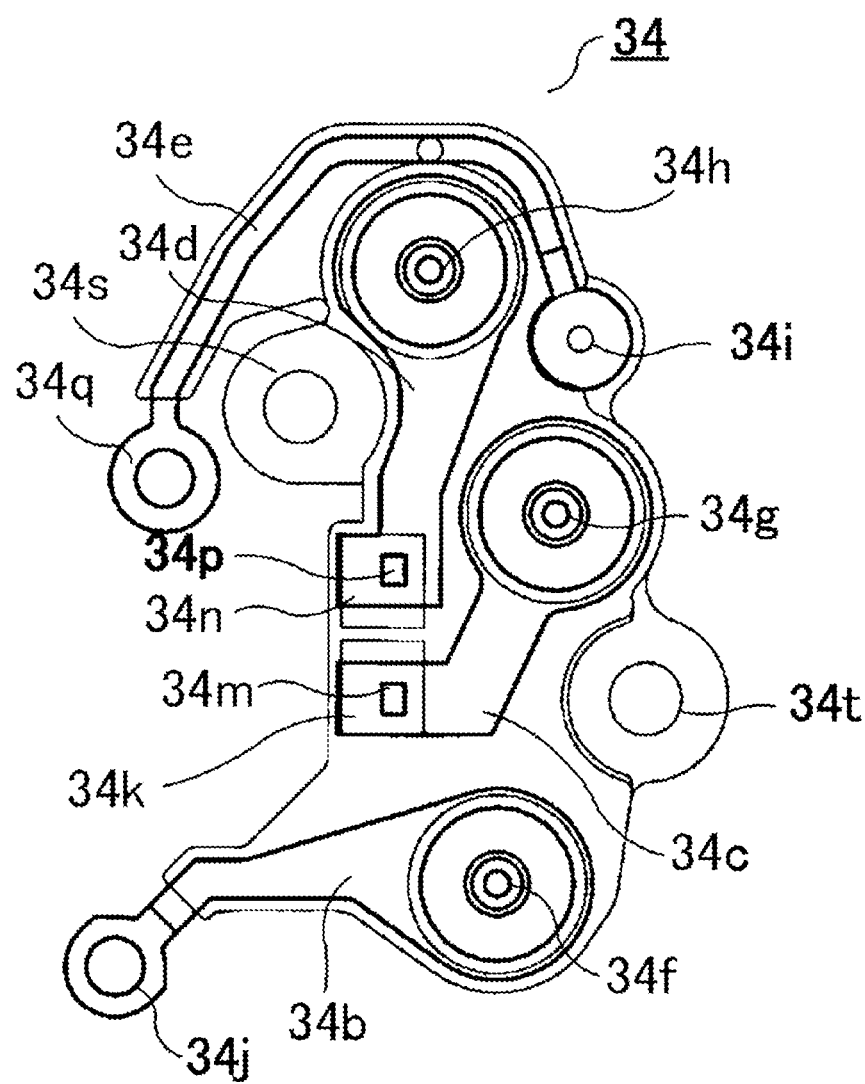
FIG. 17 is a transparent front view of a conductor terminal of the terminal shown in FIG. 12.
Figure 18:
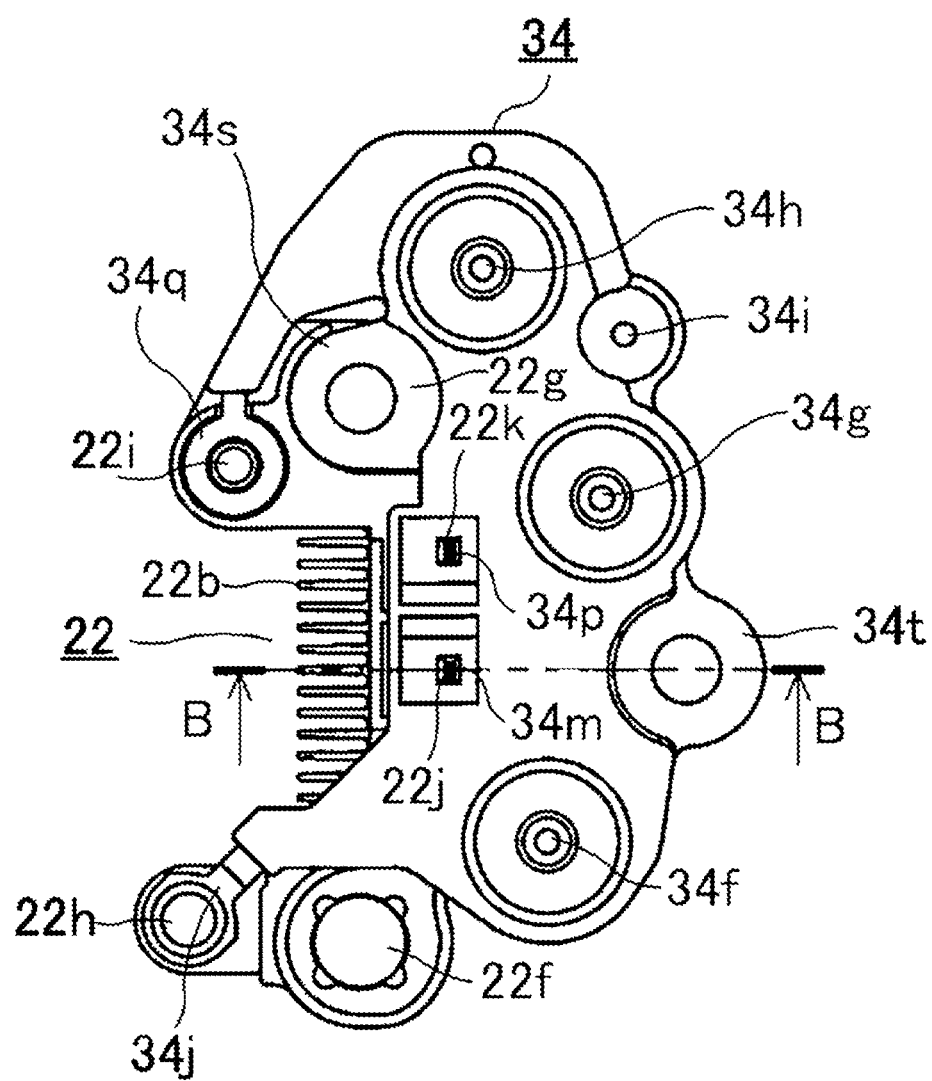
FIG. 18 is a front view of the voltage adjustment device and the terminal that are overlapped and fitted, of the brushless AC electric generator for vehicle shown in FIG. 1.
Figure 19:
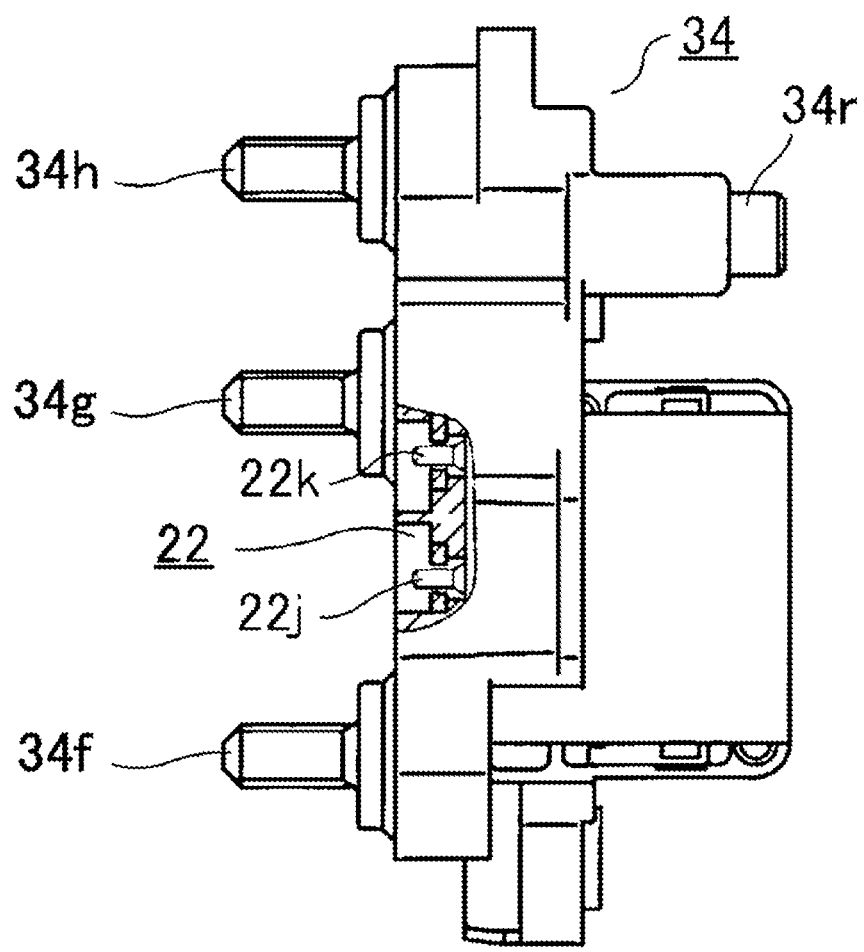
FIG. 19 is a right side view partially including a sectional view, of the voltage adjustment device and the terminal that are overlapped and fitted, shown in FIG. 18.
Figure 20:
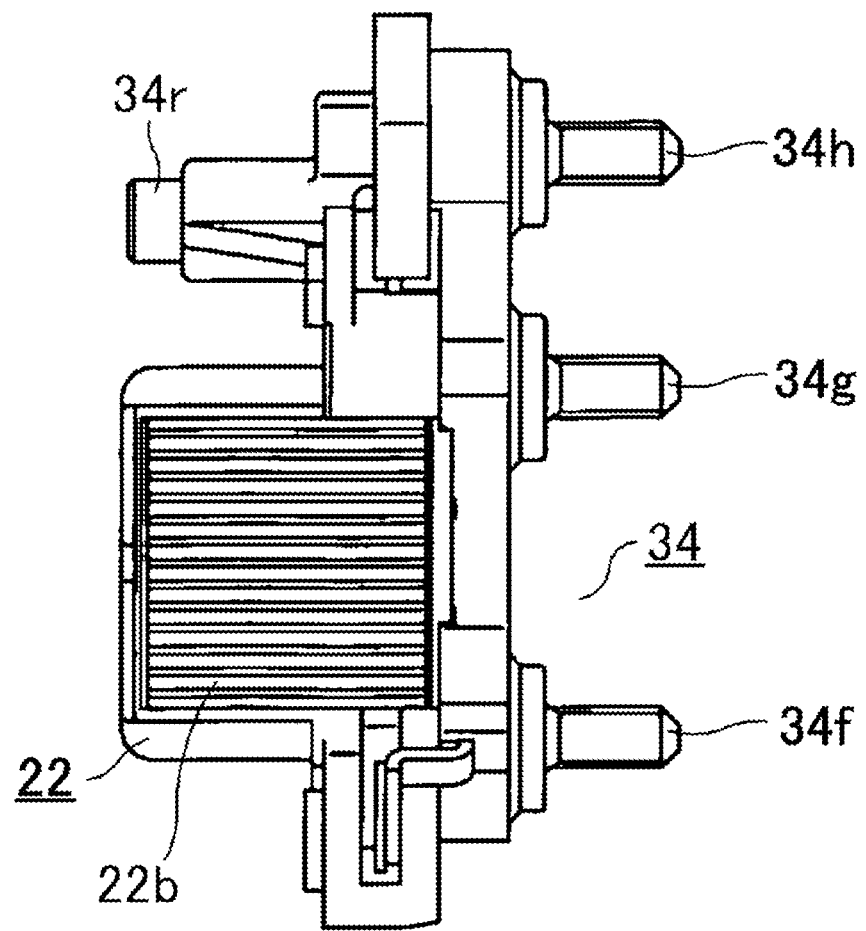
FIG. 20 is a left side view of the voltage adjustment device and the terminal that are overlapped and fitted, shown in FIG. 18.
Figure 21:
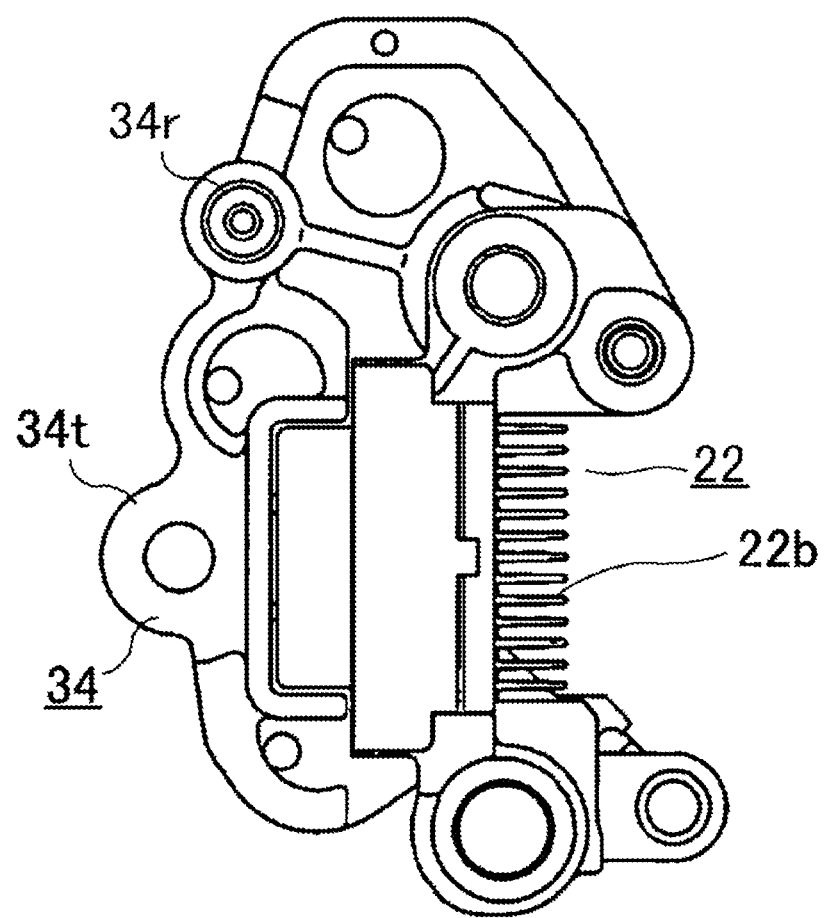
FIG. 21 is a back view of the voltage adjustment device and the terminal that are overlapped and fitted, shown in FIG. 18.
Figure 22:
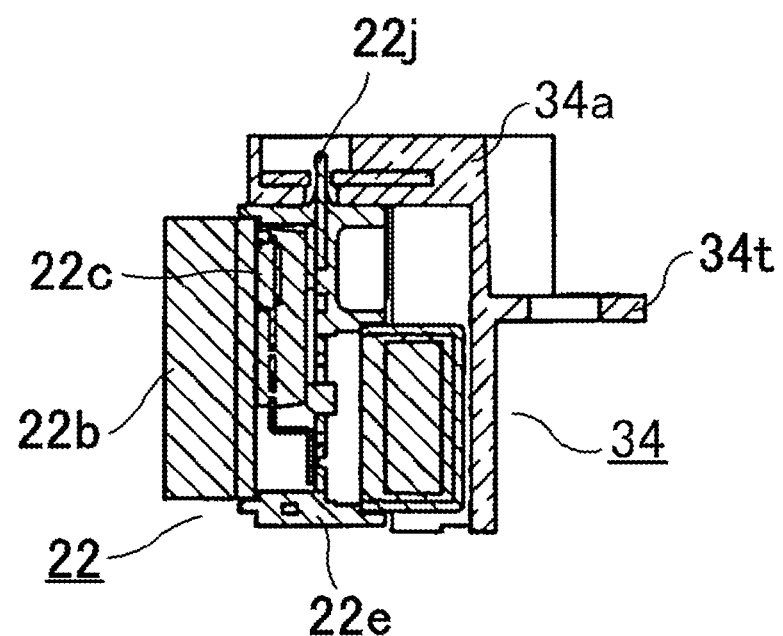
FIG. 22 is a sectional view along A-A line shown in FIG. 18.
Figure 23:
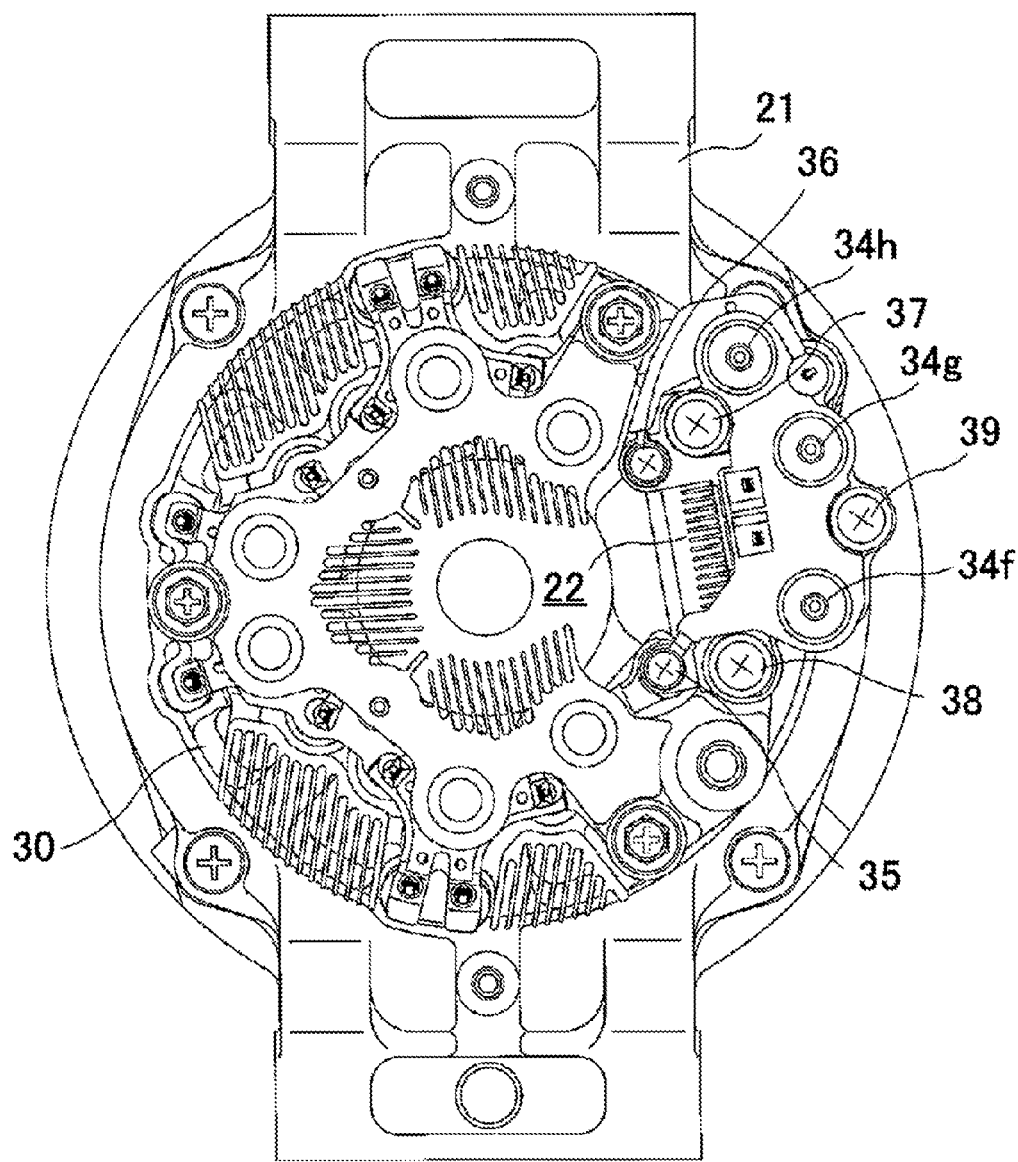
FIG. 23 is a front view of the brushless AC electric generator for vehicle shown in FIG. 1 in the state where a cover is detached, as seen from a rear side.
Figure 24:
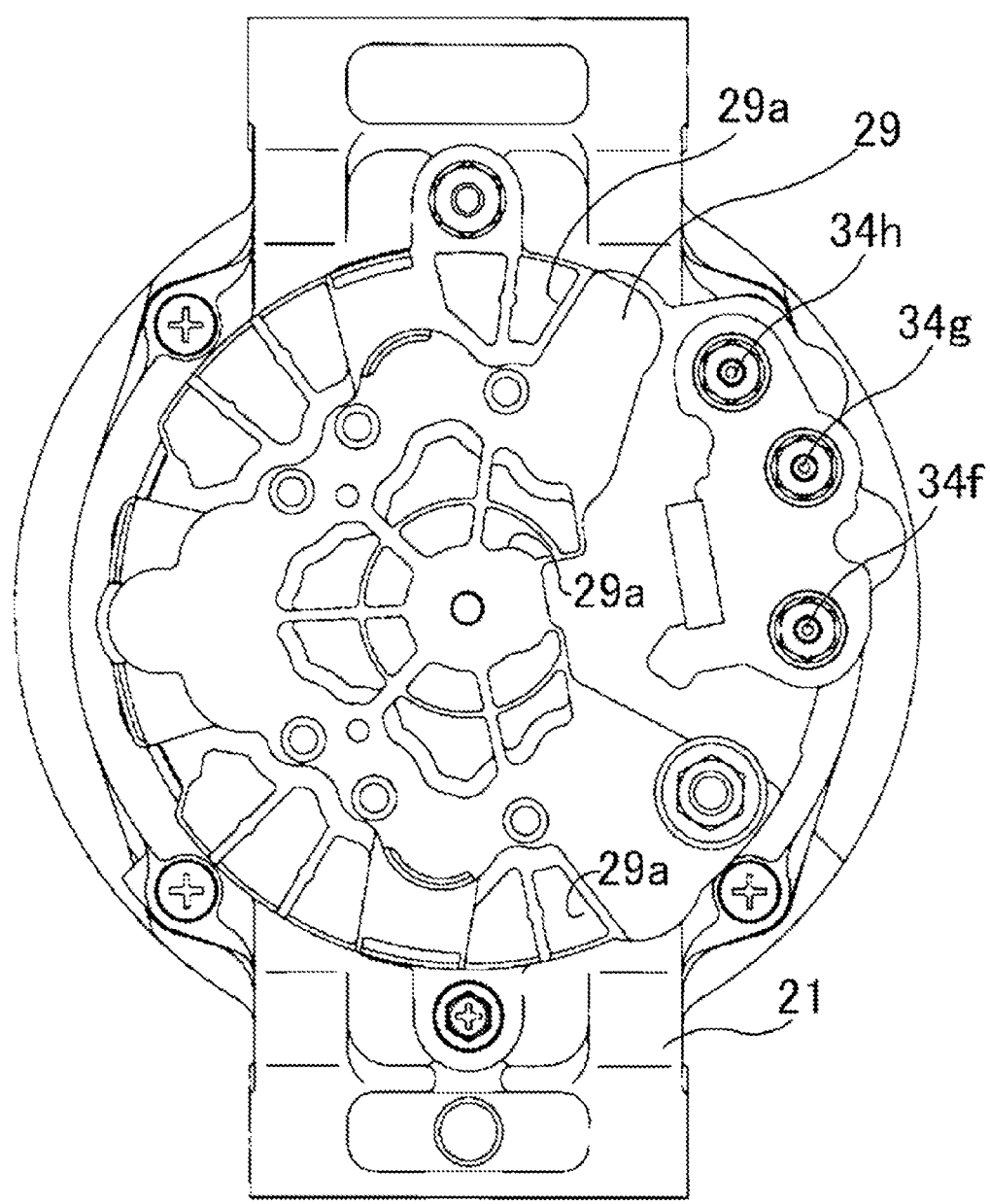
FIG. 24 is a front view of the brushless AC electric generator for vehicle shown in FIG. 1 in the state where the cover is attached, as seen from the rear side.

FIG. 1 is a vertical sectional view showing a brushless AC electric generator for vehicle according to embodiment 1 of the present invention; FIG. 2 is an enlarged sectional view showing a major part in FIG. 1; FIG. 3 is a plan view of a front bracket in FIG. 1; FIGS. 4 and 5 are front views of a rear bracket; FIG. 6 is a sectional view along G-G line in FIG. 5; FIGS. 7 to 11 are views showing a voltage adjustment device; FIGS. 12 to 17 are views showing a terminal; FIGS. 18 to 22 are views showing a structure in which the voltage adjustment device and the terminal are overlapped and fitted; FIG. 23 is a front view in the state where a cover is detached, as seen from a rear side; and FIG. 24 is a front view in the state where the cover is attached, as seen from the rear side.

In FIGS. 1 to 6, a rotor 2 is provided around a rotary shaft 17, and further, the rotor 2 has a magnetic pole iron core 3 which transmits a magnetic flux. The magnetic pole iron core 3 is composed of a first magnetic pole iron core 4 and a second magnetic pole iron core 8. A first boss portion 5 of a rotary body, which composes the first magnetic pole iron core 4, has a through hole for inserting the rotary shaft 17, at a central axis position. In addition, a fixed yoke portion 6 which is fixed to a bowl-like front bracket 20 and has a ring shape is provided being spaced radially outward from the first boss portion 5 by a minute clearance. A field coil 13 is fixed to an axial end of the yoke portion 6 via a plate 31 and a bobbin 32. Further, a first nail-like magnetic pole portion 7 is provided being spaced radially outward from the yoke portion 6 by a minute clearance. The first nail-like magnetic pole portion 7 is fixed to a second nail-like magnetic pole 11 via a ring 12 made of a non-magnetic material, and is provided so as to be engaged with the second nail-like magnetic pole 11. It is noted that the rotary shaft 17 is pressed into the through hole provided at the central axis of the first magnetic pole iron core 4, and thus attached so as not be relatively rotatable. On the other hand, a second boss portion 9 composing a second magnetic pole iron core 8 has a through hole for inserting the rotary shaft 17, at the central axis position, as in the first magnetic pole iron core 4. A ring-shaped yoke portion 10 of a rotary body extends radially outward from one end of the second boss portion 9, and further, the second nail-like magnetic pole portion 11 extends toward the other axial end from the outer circumference of the yoke portion 10.

It is noted that the rotary shaft 17 is pressed into the through hole provided at the central axis of the second magnetic pole iron core 8, and thus attached so as not to be relatively rotatable, and in the state where an axial-end surface of the second boss portion 9 abuts the other axial-end surface of the first boss portion 5, they are attached so as not to be relatively rotatable.

Further, a stator 14 has a stator iron core 15 wound with a stator coil 16, and is provided so as to surround the outer circumference of the rotor 2. The front bracket 20, together with a rear bracket 21, holds the stator iron core 15 so as to sandwich shoulder portions at both axial ends of the stator iron core 15 by using a through bolt 23. The front bracket 20 rotatably supports one end side of the rotary shaft 17 via a front bearing 18, and the rear bracket 21 rotatably supports the other end side of the rotary shaft 17 via a rear bearing 19. Thus, the rotor 2 is rotatably provided within the front bracket 20 and the rear bracket 21. On the rotary shaft 17, a cooling fan 33 is fixed outside the front bracket 20. Further, a pulley 24 is fixed to one end of the rotary shaft 17 extending outward from the front bracket 20, and is driven by an engine (not shown).

On the outside of the rear bracket 21, a voltage adjustment device 22 is attached for controlling applied current of the field coil 13. A terminal 34 is attached integrally with the voltage adjustment device 22 so as to be overlapped and fitted in the axial direction. In addition, as shown in FIG. 23, on the outside of the rear bracket 21, a rectification device 30 is attached so as to surround the voltage adjustment device 22 and the terminal 34. Further, as shown in FIG. 24, a resin cover 29 is fixed to the rear bracket 21 so as to surround the voltage adjustment device 22, the terminal 34, and the rectification device 30. A plurality of intake holes 29a for introducing cooling air are provided in the resin cover 29. A lead-out lead wire 25 for connecting the voltage adjustment device 22 and the field coil 13 is provided at inner circumferential portions of both brackets 20 and 21. One end of the lead-out lead wire 25 is connected to the field coil 13, and the other end is connected to the voltage adjustment device 22 via the terminal 34. The lead-out lead wire 25 has a first insulation tube 28 formed by an impregnation resin, on the outer circumference thereof across almost the whole length. An accommodation groove 20a which is a tetragonal depressed portion is provided on a side-surface inner wall of the front bracket 20. In addition, an accommodation groove 20b which is a depressed portion having an ark-like sectional shape is formed on an inner wall on the stator iron core 15 attachment side of the front bracket 20. Further, a mold body 26 for protecting the lead-out lead wire 25 in an insulating manner is provided so as to be fitted into each of the accommodation grooves 20a and 20b. A portion of the mold body 26, that is fitted into the accommodation groove 20a, is formed in a tetragonal shape, and a portion fitted into the accommodation groove 20b is formed in a cylindrical shape. Each portion is accommodated to be positioned within the grooves 20a and 20b.

One end of the mold body 26 is attached to the yoke portion 6, and the other end is attached by being sandwiched between end surfaces of the front bracket 20 and the rear bracket 21.

The cooling fan 33 which is a centrifugal fan of external fan type and is fixed to the rotary shaft 17, is provided between the outside of the front bracket 20 and the pulley 24. The front bracket 20 and the rear bracket 21 respectively have a plurality of vent holes 20c and a plurality of vent holes 21c. By rotation of the cooling fan 33, cooling air enters from the intake hole 29a of the cover 29 to pass through the vent hole 21c of the rear bracket 21, pass between the nail-like magnetic pole portions 7 and 11 and on the inner circumferential surface of the stator coil 16, and then pass through the vent hole 20c of the front bracket 20 to flow outward in the radial direction.

In addition, a through hole 21a for inserting and holding the lead-out lead wire 25 is formed at an inner circumferential portion of the rear bracket 21. The through hole 21a has a circular sectional shape and has a greater inner diameter than the lead wire diameter so that the lead-out lead wire 25 can be inserted. In addition, at most part of an attachment portion of the lead-out lead wire 25 on the accommodation grooves 20a and 20b and the through hole 21a, a second tube 27 made of a silicon tube is provided on the outer circumference of the first tube 28. Further, the field coil 13 side of the lead-out lead wire 25 is connected to the field coil 13 through a through hole provided at an inner circumferential portion of the yoke portion 6.

Next, the voltage adjustment device 22 will be described in detail.

FIGS. 7 to 11 are views showing the configuration of the voltage adjustment device 22 of the present embodiment 1.

In FIGS. 7 to 11, 22a is a heat sink made of aluminum or the like, and a plurality of fins 22b are formed integrally therewith. 22c is a semiconductor chip attached on the heat sink 22a, and is sealed in by a resin 22d. 22e is a case for accommodating the semiconductor chip 22c and the resin 22d, and is formed integrally with the heat sink 22a. 22f is a B terminal, 22g is an earth terminal, and 22h is a P terminal, and they are connected to an output for one phase of the stator coil 16. 22i is an F terminal, and is connected to the field coil 13. 22j is an S terminal, and is a voltage detection terminal. 22k is an L terminal, and is connected to a display lamp circuit. The connection terminals of the S terminal 22j and the L terminal 22k protrude in the axial direction so as to form fitting portions.

Next, the terminal will be described in detail.

FIGS. 12 to 17 are views showing the configuration of the terminal 34 of the present embodiment 1.

In FIGS. 12 to 17, 34a is a resin molded portion, and is molded by resin integrally with a P terminal portion 34b, an S terminal portion 34c, an L terminal portion 34d, and an F terminal portion 34e.

34f is a P terminal bolt connected to the P terminal portion 34b and protruding in the axial direction. 34g is an S terminal bolt connected to the S terminal portion 34c and protruding in the axial direction. 34h is an L terminal bolt connected to the L terminal portion 34d and protruding in the axial direction. 34i is a terminal portion that is one end of the F terminal portion 34e. 34j is a ring terminal that is the other end of the P terminal portion 34b. 34k is a terminal that is the other end of the S terminal portion 34c, and has a through hole 34m as a portion to be fitted. 34n is a terminal that is the other end of the L terminal portion 34d, and has a through hole 34p as a portion to be fitted. 34q is a ring terminal that is the other end of the F terminal portion 34d. 34r is a cylindrical protrusion into which the other end of the lead-out lead wire 25 is inserted, and is fitted into the through hole 21a of the rear bracket 21. 34s is an attachment portion. 34t is an arm portion for attachment to the rear bracket 21.

The voltage adjustment device 22 and the terminal 34 are attached integrally in the axial direction, to the outside of the rear bracket 21 by fastening screws 35, 36, 37, 38, and 39.

FIGS. 18 to 22 are views showing a structure in which the voltage adjustment device 22 and the terminal 34 are integrally overlapped and fitted.

In FIGS. 18 to 22, first, the voltage adjustment device 22 is temporarily fixed at a predetermined attachment seat on the outside of the rear bracket 21. In this state, the S terminal 22j and the L terminal 22k protrude in the axial direction. Thereafter, the terminal 34 is placed on the voltage adjustment device 22 from the axial direction.

At this time, fitting position adjustment is performed so that the S terminal 22j and the L terminal 22k of the voltage adjustment device 22 will be inserted into the through hole 34m and the through hole 34p of the terminal, and then the terminal 34 is overlapped and fitted to the voltage adjustment device 22. Thus, the P terminal 22h and the terminal 34j, the earth terminal 22g and the attachment portion 34s, and the F terminal 22i and the terminal 34q of both members are fitted to each other. Thereafter, as shown in FIG. 23, the P terminal, the F terminal, and the earth terminal are fixed to the rear bracket 21 by the fastening screw 35, the fastening screw 36, and the fastening screw 37, respectively, at the same time. In addition, the voltage adjustment device 22 and the terminal 34 are fixed to the rear bracket 21 by the fastening screw 38 and the fastening screw 39, respectively.

Thereafter, the resin cover 29 for surrounding the voltage adjustment device 22, the terminal 34, and the rectification device 30 is attached to the rear bracket 21. The P terminal bolt 34f, the S terminal bolt 34g, and the L terminal bolt 34h of the terminal 34 protrude outward from the cover 29.

These terminal bolts 34f, 34g, and 34h are each connected to an external terminal of an external apparatus (not shown) via a lead wire or the like.

In the brushless AC electric generator for vehicle thus configured, current is supplied from a battery (not shown) to the field coil 13, whereby a magnetic flux $\Phi$ is generated around the field coil 13. The magnetic flux $\Phi$ flows through the following route. That is, the magnetic flux Φ is transmitted from the yoke portion 6 through the minute clearance retained on the radial inside to the first boss portion 5, and then passes through the second boss portion 9 whose end surface abuts to the first boss portion 5, the yoke portion 10, and then the second nail-like magnetic pole portion 11. Then, the magnetic flux Φ crosses the stator 14 located on the radial outside of the rotor 2, passes through the first nail-like magnetic pole portion 7 and the minute clearance on the radial inside thereof, and finally returns to the yoke portion 6. Therefore, the second nail-like magnetic pole portion 11 is magnetized to N pole and the first nail-like magnetic pole portion 7 is magnetized to S pole.

On the other hand, by the pulley 24 being driven by an engine, the rotary shaft 17 directly connected to the pulley 24 rotates, whereby the rotor 2 rotates. By the rotation, a magnetic field generated by the field coil 13 also rotates, and the magnetic flux Φ forming the rotating magnetic field is provided to the stator iron core 15 through the above-described route, whereby AC electromotive force occurs in the power stator coil 16. AC current generated in the stator coil 16 by the AC electromotive force is rectified into DC by the rectification device 30, and the battery (not shown) is charged. At this time, since the field coil 13 is attached to the yoke portion 6 fixed on the front bracket 20, the field coil 13 does not rotate, but the first boss portion 5 and the first nail-like magnetic pole portion 7 of the first magnetic pole iron core 4, and the second magnetic pole iron core 8 integrally formed by the second boss portion 9, the yoke portion 10, and the second nail-like magnetic pole portion 11, rotate.

In the present embodiment 1, the lead-out lead wire 25 is inserted into the mold body 26, whereby the lead-out lead wire 25 can be fixed and held, and also, is electrically and mechanically protected from the rotor 2. In addition, by the accommodation grooves 20a and 20b and the through hole 21a provided on the brackets 20 and 21, the mold body 26 can be attached to the brackets 20 and 21. Therefore, the mold body 26 does not drop off even when vibration occurs, and can be sufficiently protected from water or dust. Also, since positioning thereof is easy, the lead-out lead wire 25 can be reliably and easily fixed on the brackets 20 and 21.

In addition, a flange portion of the mold body 26 is fixed by being sandwiched between both brackets 20 and 21, whereby the mold body 26 can be further reliably fixed and held. Further, work for fixing the lead-out lead wire 25 by an adhesive agent or the like is removed, whereby workability is improved.

In a fixing method using an adhesive agent or the like, the adhesion might be released during the work, so that the rotor 2 and the lead wire 25 might contact with each other. However, the fixing method of the present invention can also solve such a problem.

Further, since the lead-out lead wire 25 is inserted into the mold body 26 and the double layer tubes 27 and 28, exposure thereof is decreased, so that the influence of water, dust, or the like can be further reduced.

In addition, in order to connect the lead-out lead wire 25 to the voltage adjustment device 22 attached on the outside of the rear bracket 21, the lead-out lead wire 25 is inserted into the through hole 21a of the rear bracket 21. Therefore, the connection to the voltage adjustment device 22 can be made using the lead-out lead wire 25 having an extremely short dimension, and also, the lead-out lead wire 25 can be protected and reliably guided.

Further, the cylindrical protrusion 34r into which the lead wire 25 for connecting the field coil 13 and the voltage adjustment device 22 is inserted is provided at an axial end of the terminal 34 opposite to the external connection terminal bolts 34f, 34g, and 34h, and the protrusion 34r is fitted into the through hole 21a of the rear bracket 21. Therefore, positioning of the terminal 34 with respect to the rear bracket 21 can be made, so that assembly is facilitated. In addition, since the lead-out lead wire 25 of the field coil 13 is surrounded and protected by the through hole 21a of the rear bracket 21 and the protrusion 34r of the terminal 34, entry of water, dust, and the like can be suppressed.

In addition, since the voltage adjustment device 22 and the terminal 34 are formed as independent bodies, each can be exchanged individually even in such cases where each has failed or deteriorated. In addition, in the terminal 34, placement of the external connection terminal bolts differs depending on the specifications of each vehicle, but even such a case can be easily coped with by preparing various kinds of terminals 34. In addition, when the voltage adjustment device 22 and the terminal 34 are overlapped and fitted, the S terminal 22j and the L terminal 22k protruding on the voltage adjustment device 22 are inserted into the through holes 34m and 34p for the terminals of the terminal 34, thereby enabling fitting and positioning. Therefore, assembly is facilitated. In addition, the P terminal 22h and the terminal 34j, the earth terminal 22g and the attachment portion 34s, and the F terminal 22i and the terminal 34q of the voltage adjustment device 22 and the terminal 34 are respectively fixed by common fastening screws 35, 37, and 36 from the axial direction. Therefore, the number of components is decreased and assembly workability is facilitated. Further, since the voltage adjustment device 22 and the terminal 34 are placed on the rear bracket 21 so as to be overlapped and fitted in the axial direction, the attachment area in each of the circumferential direction and the radial direction can be decreased. Therefore, the heat sink attachment area on the rectification device 30 which is adjacently placed can be increased, whereby cooling performance can be improved and output can be improved. In addition, since the P terminal bolt 34f, the S terminal bolt 34g, the L terminal bolt 34h, and the fastening screws for fastening the terminals are guided in the axial direction, the attachment area in each of the circumferential direction and the radial direction of the terminal 34 itself can be further reduced.

Although the above description has shown an application to the brushless AC electric generator for vehicle as an example, application to an AC electric generator for vehicle with brush is also possible.

In addition, although all of the above examples are application to an AC electric generator, application to an electric motor generator having both functions of electric motor and electric generator is also possible.

Further, although the above description has shown a nail-like magnetic pole as the rotary magnetic pole as an example, the rotary magnetic pole is not limited thereto.

The invention claimed is:
1. A rotary electric machine for vehicle, comprising:
a rotary shaft;
a magnetic pole iron core fixed to the rotary shaft and having a magnetic pole;
a field coil attached at an inner circumferential portion of the magnetic pole iron core;
a bowl-like front bracket supported via a front bearing on the rotary shaft;
a stator iron core provided so as to oppose to the magnetic pole iron core via a minute clearance;
a stator coil wound on the stator iron core;

a bowl-like rear bracket supported via a rear bearing on the rotary shaft, and fixing the stator iron core, together with the front bracket;

a voltage adjustment device attached on the outside of the rear bracket, for controlling applied current in the field coil; and a terminal attached on the outside of the rear bracket so as to be overlapped and fitted to the voltage adjustment device in an axial direction, wherein a fitting portion made of a conductor is provided on a surface of the voltage adjustment device, that opposes to the terminal, a portion to be fitted, which is made of a conductor, is provided on a surface of the terminal, that opposes to the voltage adjustment device, and the voltage adjustment device and the terminal are integrally fixed on the outside of the rear bracket, with the fitting portion being fitted into the portion to be fitted, wherein the terminal and the voltage adjustment device are removably attached to one another, wherein the fitting portion extends axially away from the voltage adjustment device.

2. The rotary electric machine for vehicle according to claim 1, wherein an external connection terminal protruding in the axial direction is provided on the terminal.

3. The rotary electric machine for vehicle according to claim 2, wherein a cover for surrounding the voltage adjustment device and the terminal is provided on the rear bracket, and an end of the external connection terminal protrudes outward from the cover.

4. The rotary electric machine for vehicle according to claim 1, wherein a cooling fan fixed to the rotary shaft is provided on the outside of the front bracket, thereby causing cooling air to flow from a vent hole of the rear bracket to a vent hole of the front bracket.

5. The rotary electric machine for vehicle according to claim 4, wherein an intake hole through which the cooling air is taken in by rotation of the cooling fan is provided in the cover.

6. The rotary electric machine for vehicle according to claim 1, wherein the voltage adjustment device is positioned between the terminal and the rear bracket.

7. A rotary electric machine for vehicle, comprising:
a rotary shaft;
a magnetic pole iron core fixed to the rotary shaft and having a magnetic pole;
a field coil attached at an inner circumferential portion of the magnetic pole iron core;
a bowl-like front bracket supported via a front bearing on the rotary shaft;
a stator iron core provided so as to oppose to the magnetic pole iron core via a minute clearance;
a stator coil wound on the stator iron core;
a bowl-like rear bracket supported via a rear bearing on the rotary shaft, and fixing the stator iron core, together with the front bracket;
a voltage adjustment device attached on the outside of the rear bracket, for controlling applied current in the field coil; and
a terminal attached on the outside of the rear bracket so as to be overlapped and fitted to the voltage adjustment device in an axial direction, wherein
a fitting portion made of a conductor is provided on a surface of the voltage adjustment device, that opposes to the terminal,
a portion to be fitted, which is made of a conductor, is provided on a surface of the terminal, that opposes to the voltage adjustment device, and
the voltage adjustment device and the terminal are integrally fixed on the outside of the rear bracket, with the fitting portion being fitted into the portion to be fitted,
wherein a cylindrical protrusion into which a lead wire for connecting the field coil and the voltage adjustment device is inserted is provided on an axial end of the terminal, that is opposite to the external connection terminal, and a through hole into which the cylindrical protrusion can be attached is provided in the rear bracket.

8. The rotary electric machine for vehicle according to claim 7, wherein a mold body for protecting the lead wire so as to be insulated, and a groove to which the mold body is attached, are provided on an inner wall of the front bracket.

9. The rotary electric machine for vehicle according to claim 7, wherein one end of the mold body is attached to a yoke portion supporting the field coil, the other end is sandwiched between both brackets, and a connection portion connecting the one end and the other end is fixed on the groove.

10. The rotary electric machine for vehicle according to claim 7, wherein an insulation tube is attached on the lead wire.

* * * * *